United States Patent Office 3,247,150
Patented Apr. 19, 1966

3,247,150
CHLOROETHYLENIC POLYMER LATEX STABILIZED WITH CHLORATE AND BISULFITE
Harold G. Hahn, Midland, Mich., and Robert L. Visger, Berea, Ohio, assignors to The Dow Chemical Company, Midland, Mich., a corporation of Delaware
No Drawing. Filed May 13, 1960, Ser. No. 28,849
7 Claims. (Cl. 260—29.6)

This invention concerns improvements in polymer latex compositions and, more particularly, concerns the heat stability of chloroethylenic polymer latexes.

Chloroethylenic polymers have a tendency, when heated, to undergo degradation resulting in dark colored decomposition products. This property has resulted not only in a loss of physical properties of the latexes but has limited their usefulness where clearness of the latex or selective pigmentation is desired.

In United States Patent No. 2,643,983, Walter suggests intimately dispersing within such a polymer about 0.01–2.5 percent of a metal salt of an oxygen acid of chlorine; for example, sodium chlorate. We have found, however, that although such stabilizers, particularly if they are water soluble chlorates, do improve the heat stability of chloroethylenic polymers, the improvement is not sufficient for many of the uses to which such polymers are put.

It is therefore an object of this invention to improve the heat stability of chloroethylenic polymer latexes.

The foregoing and related objects can be obtained in a heat stabilized composition of a chloroethylenic polymer containing minor proportions of a water soluble chlorate and a water soluble reducing agent.

The unstable polymeric material adapted to be used in the compositions of the invention comprises any chloroethylenic polymer. This includes, in particular, homopolymers of vinyl chloride and vinylidene chloride as well as copolymers and other interpolymers of vinyl chloride and/or vinylidene chloride with other ethylenic unsaturated comonomers such as vinyl acetate; acrylonitrile; vinyl propionate; the alkyl, cycloalkyl, and aryl acrylates; and the like. The polymeric material also includes blends of a chloroethylenic polymer or copolymer with a non-chlorine containing polymer or copolymer. Degradation of relatively small proportions of chloroethylenic polymers can affect significantly relatively large proportions of other polymers associated therewith.

As indicated above the composition of the invention includes a minor proportion of a water soluble chlorate, as suggested in the prior art cited. Among the water soluble chlorates we prefer the alkali metal chlorates, particularly sodium chlorate and potassium chlorate. Up to about 3 percent of a water soluble chlorate is sufficient to obtain the full advantages of the invention.

We have found that a minor proportion of a water soluble reducing agent, together with the water soluble chlorate, adds significantly to the thermal stability of the chloroethylenic polymer. Up to about 2 percent of the reducing agent is sufficient to obtain the full advantage of the invention. Although there is a wide selection of reducing agents from which to draw we prefer oxalate ion and bisulfite ion derived, for example, from oxalic acid and sodium bisulfite.

The chlorate and reducing agent can be added to the composition prior to polymerization or, alternatively, portions can be added prior to polymerization and further portions can be added subsequently to the dispersed latex. For example, 0.75 percent sodium chlorate can be added prior to polymerization and, as a post polymerization additive, 0.5 percent sodium chlorate and 1.0 percent oxalic acid can be added.

EXAMPLE 1

A 50 percent solids vinyl chloride copolymer latex, wherein the copolymer consisted of 75 percent vinyl chloride and 25 percent vinylidene chloride, was prepared in the usual manner except that a first portion had no chlorate or oxalate additive, a second portion had 3 percent sodium chlorate added, and a third portion had 3 percent sodium chlorate plus 1.5 percent oxalic acid added.

The dried polymer samples were aged overnight at 60° C. and were then heated at 150° C. for 15 minutes in spot porcelain plates for heat stability evaluation. The following results were obtained.

| Sample | Percent Sodium chlorate | Percent oxalic acid | Final color |
|---|---|---|---|
| 1 | 0 | 0 | Brown. |
| 2 | 3 | 0 | Light orange. |
| 3 | 3 | 1.5 | White-yellow. |

EXAMPLE 2

A latex similar to that of Example 1 was formed except that 0.75 percent sodium chlorate was added to the polymerization charge. The samples were modified as shown in the accompanying table, were aged overnight at 60° C., and were then heated at 150° C. for 7 minutes and 30 minutes respectively in spot porcelain plates.

| Sample | Polymerization Additive | Post Additive | Final Color | |
|---|---|---|---|---|
| | | | 7 Min. | 30 Min. |
| 1 | None | None | Yellow | Brown. |
| 2 | 0.75% NaClO$_3$ | 0.5% NaClO$_3$ | do | Do. |
| 3 | 0.75% NaClO$_3$ | 0.5% NaClO$_3$, 1.0% oxalic acid. | White | Yellow. |
| 4 | 0.75% NaClO$_3$ | 0.5% NaClO$_3$, 1.0% NaHSO$_3$. | do | Do. |

The above examples were repeated using latexes formed from polymers of vinyl chloride and vinylidene chloride as well as copolymers of these materials with vinyl propionate, vinyl acetate, acrylonitrile, alkyl acrylates, cycloalkyl acrylates, and aryl acrylates. The example was also repeated using a variety of combinations of water soluble chlorates and water soluble reducing agents. Results comparable with those reported in the examples above were obtained.

We claim:

1. A heat stabilized composition of a polymer latex; said polymer being selected from the class consisting of vinyl chloride homopolymers, vinylidene chloride homopolymers, and copolymers of vinyl chloride and vinylidene chloride with each other and with other polymerizable compounds; said composition containing minor proportions of an alkali metal chlorate and an alkali metal bisulfite.

2. A heat stabilized composition of a polymer latex; said polymer being selected from the class consisting of vinyl chloride homopolymers, vinylidene chloride homopolymers, and copolymers of vinyl chloride and vinylidene chloride with each other and with other polymerizable compounds; said composition containing up to about 3 percent sodium chlorate and up to about 2 percent sodium bisulfite.

3. The composition according to claim 1 wherein the polymer is a copolymer of vinyl chloride and vinylidene chloride.

4. The composition according to claim 1 wherein the polymer is a copolymer of vinyl chloride and vinyl propionate.

5. The composition according to claim 1 wherein the polymer is a copolymer of vinyl chloride and vinyl acetate.

6. The composition according to claim 1 wherein the polymer is a copolymer of vinyl chloride and an alkyl acrylate.

7. The composition according to claim 1 wherein the polymer is a copolymer of vinyl chloride and an aryl acrylate.

References Cited by the Examiner

UNITED STATES PATENTS

| | | | |
|---|---|---|---|
| 2,140,518 | 12/1938 | Doolittle | 260—45.7 |
| 2,462,422 | 2/1944 | Plambeck | 260—48.85 |
| 2,557,474 | 6/1951 | Sanderson | 260—29.6 |
| 2,960,490 | 11/1960 | Hinkes | 260—45.85 |

MURRAY TILLMAN, *Primary Examiner.*

DAN ARNOLD, LEON J. BERCOVITZ, *Examiners.*